United States Patent
Mouri et al.

(10) Patent No.: US 11,684,979 B2
(45) Date of Patent: Jun. 27, 2023

(54) ADDITIVE MANUFACTURING AND ADDITIVE MANUFACTURING METHOD

(71) Applicant: IHI CORPORATION, Tokyo (JP)

(72) Inventors: Masashi Mouri, Tokyo (JP); Masato Yamada, Tokyo (JP); Yuki Kozue, Tokyo (JP)

(73) Assignee: IHI CORPORATION, Tokyo (JP)

( * ) Notice: Subject to any disclaimer, the term of this patent is extended or adjusted under 35 U.S.C. 154(b) by 389 days.

(21) Appl. No.: 16/757,613

(22) PCT Filed: Oct. 30, 2018

(86) PCT No.: PCT/JP2018/040336
§ 371 (c)(1),
(2) Date: Apr. 20, 2020

(87) PCT Pub. No.: WO2019/088101
PCT Pub. Date: May 9, 2019

(65) Prior Publication Data
US 2021/0197284 A1 Jul. 1, 2021

(30) Foreign Application Priority Data
Oct. 31, 2017 (JP) .............................. JP2017-211374

(51) Int. Cl.
*B22F 12/13* (2021.01)
*B33Y 30/00* (2015.01)
(Continued)

(52) U.S. Cl.
CPC .............. *B22F 12/13* (2021.01); *B22F 10/28* (2021.01); *B22F 10/362* (2021.01); *B22F 12/90* (2021.01);
(Continued)

(58) Field of Classification Search
CPC ................................ B22F 12/13; B33Y 40/10
See application file for complete search history.

(56) References Cited

U.S. PATENT DOCUMENTS

| | | | |
|---|---|---|---|
| 2016/0236279 A1 | 8/2016 | Ashton et al. | |
| 2018/0169938 A1* | 6/2018 | Inenaga | B33Y 30/00 |
| 2021/0039167 A1 | 2/2021 | Ashton et al. | |

FOREIGN PATENT DOCUMENTS

| | | |
|---|---|---|
| CN | 105489666 A | 4/2016 |
| CN | 105745060 A | 7/2016 |

(Continued)

OTHER PUBLICATIONS

Machine Translation of JP 2016211050A (Year: 2016).*
Arcam, "Operation Manual—Q10plus", Retrieved from the Internet: URL: https://cdme.osu.edu/sites/default/files/uploads/arcamebm_q10plus_-_3d_printer_-_manual.pdf, XP055719079 (Sep. 8, 2017).
(Continued)

*Primary Examiner* — Xiao S Zhao
*Assistant Examiner* — Nicholas J Chidiac
(74) *Attorney, Agent, or Firm* — Volpe Koenig

(57) ABSTRACT

An additive manufacturing device is an additive manufacturing device manufacturing an additively manufactured article by melting or sintering layered powder by partially applying energy to the powder. The additive manufacturing device includes a powder holding unit holding the layered powder, a heating unit preheating the powder held by the powder holding unit, a reflection unit where a reflective film including a reflective surface is disposed, the reflective surface reflecting radiant heat radiated from an object including at least one of the powder and the additively manufactured article to the powder holding unit side, and a reflective surface update unit disposing a new reflective surface in the reflection unit by moving the reflective film.

9 Claims, 4 Drawing Sheets

(51) Int. Cl.
  *B33Y 50/02* (2015.01)
  *B22F 12/44* (2021.01)
  *B22F 12/00* (2021.01)
  *B33Y 10/00* (2015.01)
  *B22F 10/28* (2021.01)
  *B22F 10/362* (2021.01)
  *B33Y 40/10* (2020.01)
  *B22F 12/90* (2021.01)
  *B22F 12/30* (2021.01)
  *B22F 12/49* (2021.01)
  *B22F 10/32* (2021.01)

(52) U.S. Cl.
  CPC .............. *B33Y 10/00* (2014.12); *B33Y 30/00* (2014.12); *B33Y 40/10* (2020.01); *B33Y 50/02* (2014.12); *B22F 10/32* (2021.01); *B22F 12/222* (2021.01); *B22F 12/30* (2021.01); *B22F 12/44* (2021.01); *B22F 12/49* (2021.01)

(56) References Cited

FOREIGN PATENT DOCUMENTS

| EP | 0283003 A2 | 9/1988 |
| EP | 3189960 A1 | 7/2017 |
| JP | 10-166461 A | 6/1998 |
| JP | 2006-234864 A | 9/2006 |
| JP | 2007-223192 A | 9/2007 |
| JP | 2008-037024 A | 2/2008 |
| JP | 2015-193135 A | 11/2015 |
| JP | 2016-211050 A | 12/2016 |
| JP | 2016211050 A * | 12/2016 |
| JP | 6154544 B1 | 6/2017 |
| WO | 2017/081812 A1 | 5/2017 |

OTHER PUBLICATIONS

C. Korner, "Additive manufacturing of metallic components by selective electron beam melting—a review", International Materials Reviews, vol. 61, No. 5, pp. 361-377, XP055624304 (May 9, 2016).

* cited by examiner

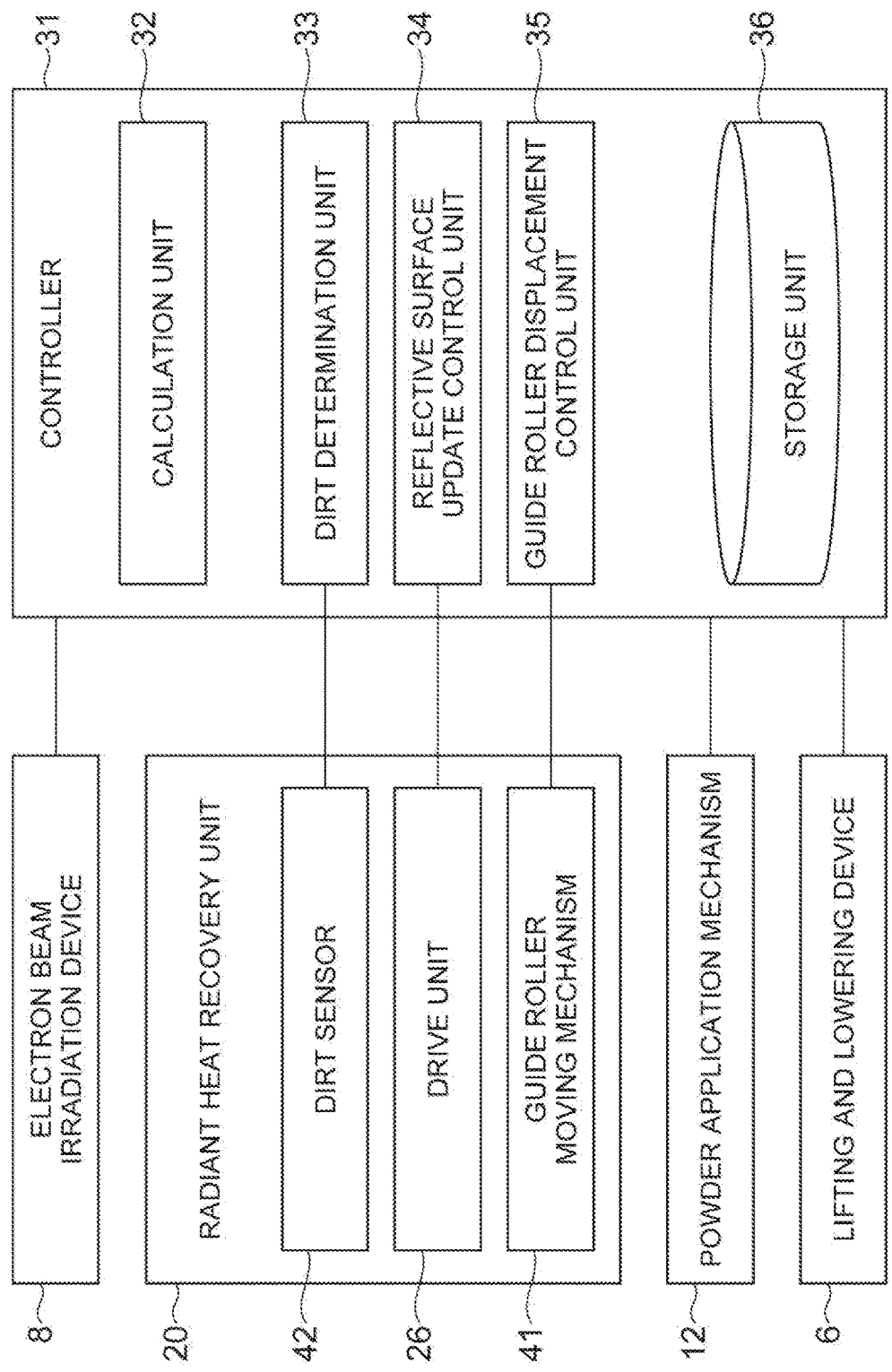

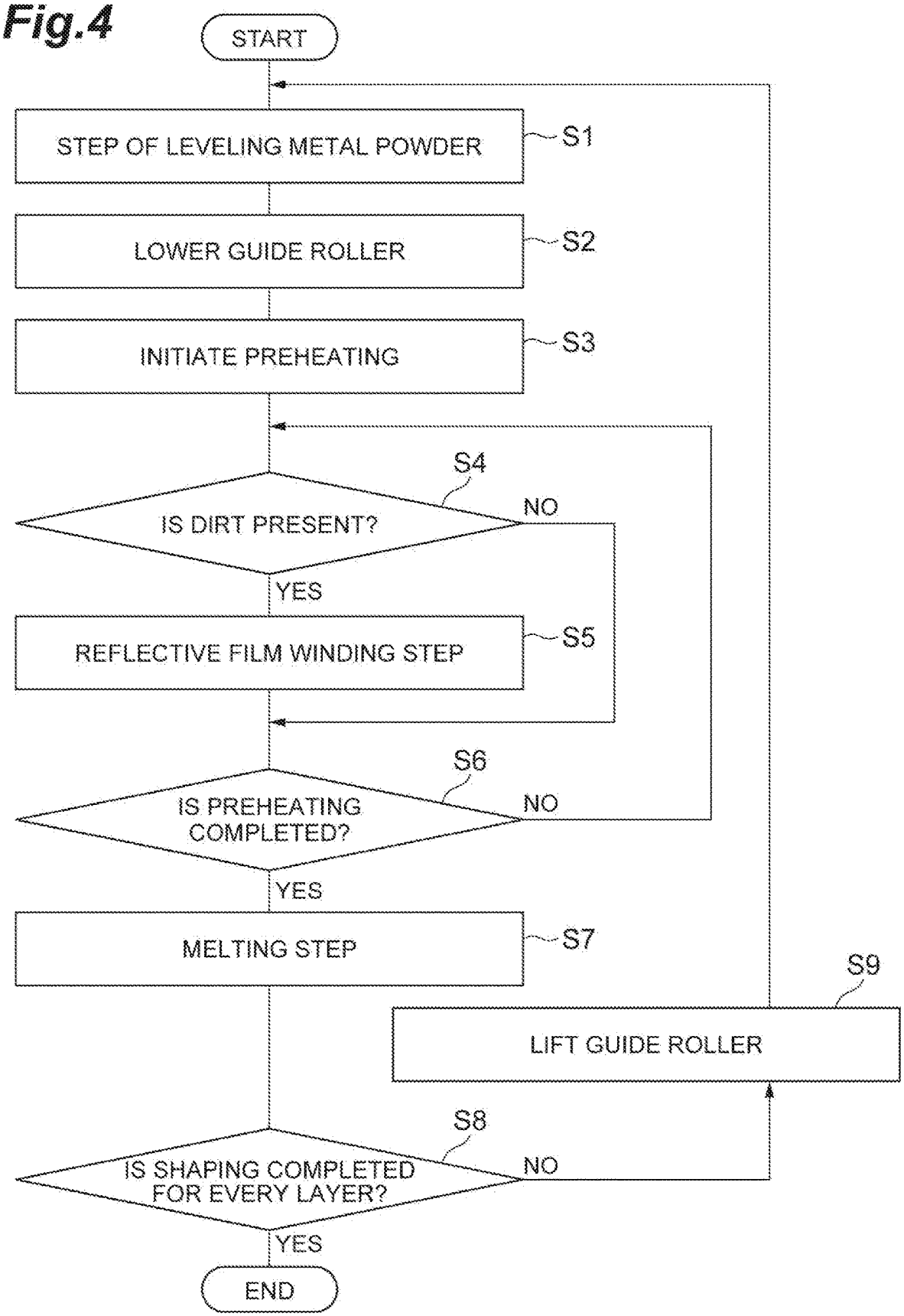

ADDITIVE MANUFACTURING AND ADDITIVE MANUFACTURING METHOD

TECHNICAL FIELD

The present disclosure relates to an additive manufacturing device and an additive manufacturing method.

BACKGROUND ART

Known in the related art is a device in which powder as a raw material is disposed in layers on a work table, energy such as a laser and an electron beam for sequential melting is applied to a selected part of the powder layer, and a three-dimensional product (hereinafter, referred to as a product) is manufactured as a result (see, for example, Patent Literature 1). In the product manufacturing device, one powder layer is partially melted, the melted powder is solidified, and then another powder layer is formed on the solidified powder. Further, the selected part is melted and solidified and the product is manufactured by this being repeated. In the device that uses the electron beam, there is a need to preheat the powder before the melting of the powder so that scattering of the metal powder is suppressed. This preheating has the effect of suppressing deformation of the product. Likewise, in the case of the laser, preheating may be performed by means of an additional heat source for preheating (such as a heater), separately from a laser heat source for melting, so that product cracking or deformation during the manufacturing is suppressed.

CITATION LIST

Patent Literature

Patent Literature 1: Japanese Unexamined Patent Publication No. 6154544

SUMMARY OF INVENTION

Technical Problem

In a case where the powder is heated, heat energy proportional to the difference between the fourth power of the absolute temperature of the heated powder and the fourth power of the ambient absolute temperature is released by radiation (radiant heat transfer). Known is a technique for recovering energy by re-warming the powder by reflecting this heat of radiation with a reflective surface disposed near the powder. However, when the powder evaporates due to the heating during the manufacturing, the evaporation component adheres to the reflective surface and a decline in reflectance arises. An object of the present disclosure is to provide an additive manufacturing device and an additive manufacturing method allowing a decline in radiant heat reflectance to be suppressed during preheating and allowing a decline in radiant heat recovery efficiency to be reduced.

Solution to Problem

An additive manufacturing device according to one aspect of the present disclosure is an additive manufacturing device manufacturing an additively manufactured article by melting or sintering layered powder by partially applying energy to the powder. The additive manufacturing device includes a powder holding unit holding the layered powder, a heating unit preheating the powder held by the powder holding unit, a reflection unit where a reflective film including a reflective surface is disposed, the reflective surface reflecting radiant heat radiated from an object including at least one of the powder and the additively manufactured article to the powder holding unit side, and a reflective surface update unit disposing a new reflective surface in the reflection unit by moving the reflective film.

Effects of Invention

According to the present disclosure, it is possible to suppress a decline in radiant heat reflectance during preheating and reduce a decline in radiant heat recovery efficiency.

BRIEF DESCRIPTION OF DRAWINGS

FIG. 3 is a block diagram illustrating a controller.

FIG. 4 is a flowchart illustrating the procedure of an additive manufacturing method.

DESCRIPTION OF EMBODIMENTS

Figure 1:
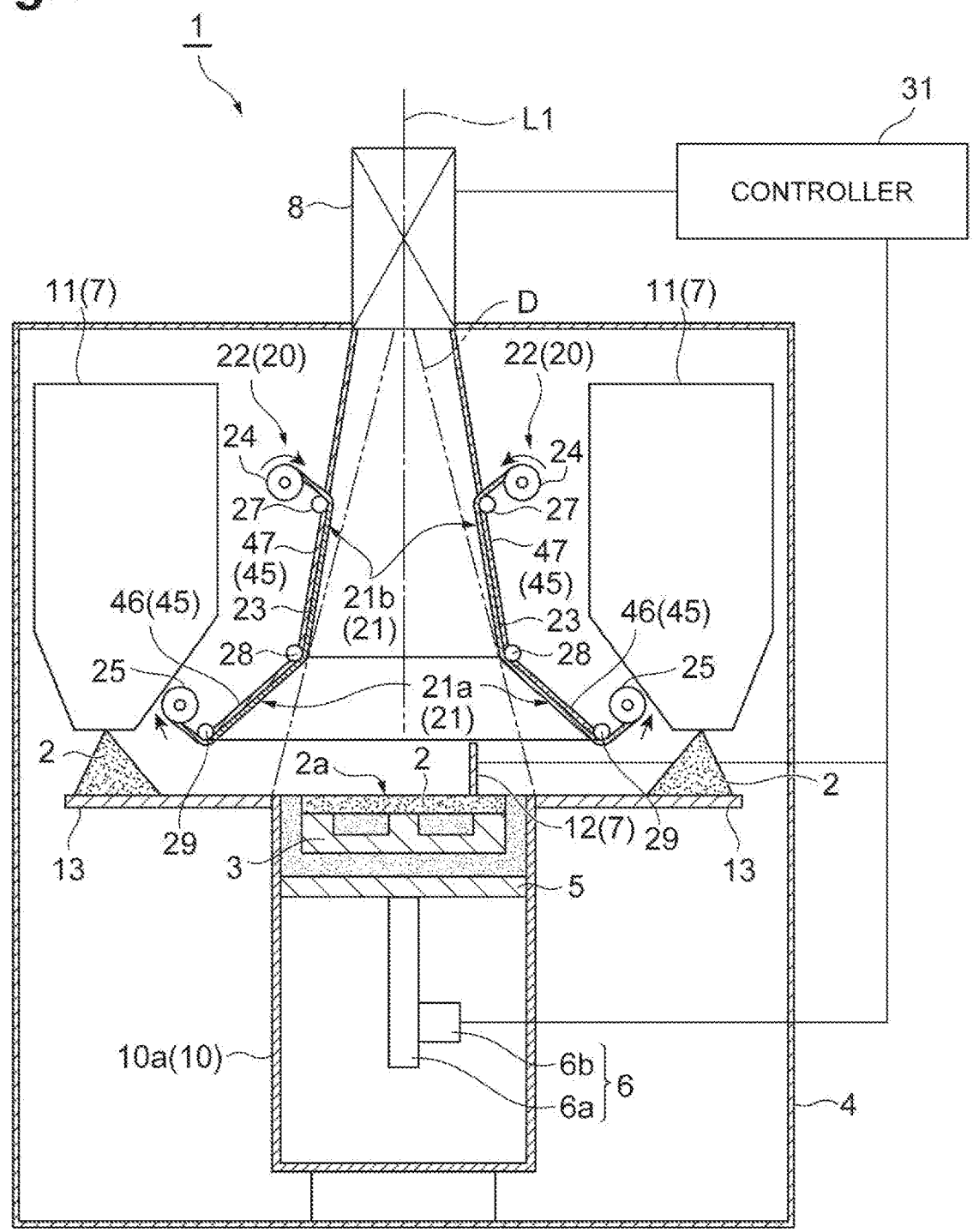
FIG. 1 is a configuration diagram illustrating an additive manufacturing device of one embodiment.

An additive manufacturing device according to one aspect of the present disclosure is an additive manufacturing device manufacturing an additively manufactured article by melting or sintering layered powder by partially applying energy to the powder. The additive manufacturing device includes a powder holding unit holding the layered powder, a heating unit preheating the powder held by the powder holding unit, a reflection unit where a reflective film including a reflective surface is disposed, the reflective surface reflecting radiant heat radiated from an object including at least one of the powder and the additively manufactured article to the powder holding unit side, and a reflective surface update unit disposing a new reflective surface in the reflection unit by moving the reflective film.

In the additive manufacturing device of the present disclosure, the powder held by the powder holding unit can be preheated, and thus the residual stress that is generated in the additively manufactured article can be suppressed. As a result, the occurrence of deformation and cracking attributable to the residual stress can be reduced. In the additive manufacturing device, the radiant heat radiated from the object including at least one of the powder and the additively manufactured article can be reflected by the reflective film during the preheating, and thus the heat loss during the preheating can be reduced. In the additive manufacturing device, the new reflective surface can be disposed by the reflective film being moved, and thus a decline in reflectance attributable to dirt on the reflective surface is suppressed. As a result, it is possible to reduce a decline in radiant heat recovery efficiency with the additive manufacturing device.

In several aspects, the reflective surface update unit may be provided with a reflective film supply roll around which the reflective film yet to be disposed in the reflection unit is wound, a reflective film recovery roll winding the reflective film after the reflective film is disposed in the reflection unit, and a drive unit driving the reflective film recovery roll. As a result, it is possible to reduce a space where the reflective film is disposed.

In several aspects, the additive manufacturing device may include a chamber accommodating the powder holding unit and the reflection unit and the reflective surface update unit may be accommodated in the chamber. As a result, there is no need to open the chamber and there is no need to restore the chamber when the reflective surface is updated. Accordingly, the reflective surface can be updated with the environment in the chamber maintained. As a result, it is possible to suppress a decline in work efficiency. For example, the reflective surface can be updated with the vacuum environment in a vacuum chamber maintained. The reflective surface can be updated with the vacuum or the inert gas atmosphere unchanged.

In several aspects, the reflective surface update unit may move the reflective film to the powder holding unit side from a side opposite to the powder holding unit with respect to the reflection unit. At a part close to the powder holding unit, an evaporation component is more likely to adhere and the reflective surface is more likely to become dirty than at a part far from the powder holding unit. With this reflective surface update unit, it is possible to move the relatively clean part to the part that is likely to become dirty and the relatively dirty part can be excluded from the reflection unit first.

In several aspects, the additive manufacturing device may include a guide roller guiding the movement of the reflective film and rotating with the movement of the reflective film. As a result, it is possible to appropriately dispose a movement path for the reflective film. In several aspects, the additive manufacturing device may include a guide roller moving mechanism displacing the guide roller. As a result, it is possible to change the disposition of the reflective film as necessary by displacing the guide roller.

In several aspects, the guide roller moving mechanism may move the guide roller so as to approach the powder holding unit side when the preheating by the heating unit is performed and move the guide roller so as to be separated from the powder holding unit when the powder is supplied to the powder holding unit. As a result, it is possible to improve the radiant heat recovery efficiency by disposing the reflective surface so as to approach the powder holding unit during the preheating. The guide roller and the reflective film do not act as a hindrance during the powder supply by the guide roller being separated from the powder holding unit.

In several aspects, the additive manufacturing device may include a dirt sensor detecting dirt on the reflective surface and an update timing setting unit setting a movement timing for the reflective film based on a result of the detection by the dirt sensor. As a result, it is possible to update the reflective surface at an appropriate timing in accordance with the degree of the dirt on the reflective surface, and thus a decline in reflectance can be reliably suppressed.

In several aspects, the reflective surface may include a first reflective surface and a second reflective surface disposed at a position farther than the first reflective surface from a surface of the powder held by the powder holding unit and an inclination angle of the first reflective surface with respect to the surface of the powder may be smaller than an inclination angle of the second reflective surface with respect to the surface of the powder. As a result, it is possible to improve the efficiency of reflection by the second reflective surface. The surface of the powder held by the powder holding unit is the surface of a powder layer including the powder held by the powder holding unit.

An additive manufacturing method according to one aspect of the present disclosure is an additive manufacturing method for manufacturing an additively manufactured article by melting or sintering layered powder by partially applying energy to the powder. The additive manufacturing method includes a preheating step of preheating the powder held by a powder holding unit before the melting or sintering of the powder, a reflection step of reflecting radiant heat radiated from an object including at least one of the powder and the additively manufactured article to the powder holding unit side, and a reflective surface update step of updating a reflective surface reflecting the radiant heat.

In the additive manufacturing method of the present disclosure, the powder held by the powder holding unit is preheated, and thus the residual stress that is generated in the additively manufactured article can be suppressed. As a result, the occurrence of deformation and cracking attributable to the residual stress can be reduced. In the additive manufacturing method, the radiant heat radiated from the object including at least one of the powder and the additively manufactured article is reflected during the preheating, and thus the heat loss during the preheating can be reduced. In the additive manufacturing method, updating to the new reflective surface can be performed, and thus a decline in reflectance attributable to dirt on the reflective surface is suppressed. As a result, it is possible to reduce a decline in radiant heat recovery efficiency with the additive manufacturing device.

Hereinafter, a preferred embodiment of the present disclosure will be described in detail with reference to the drawings. It should be noted that the same or corresponding parts are denoted by the same reference numerals in the drawings and redundant description will be omitted.

An additive manufacturing device (hereinafter, referred to as "manufacturing device") 1 illustrated in FIG. 1 is a so-called 3D printer. The manufacturing device 1 solidifies layered metal powder (conductor powder) 2 by melting or sintering the metal powder 2 by partially applying energy to the metal powder 2. The manufacturing device 1 manufactures a three-dimensional component (additively manufactured article) 3 by repeating this a plurality of times. The three-dimensional component 3 is, for example, a machine component and the three-dimensional component 3 may be another structure. Examples of the metal powder include titanium-based metal powder, Inconel (registered trademark) powder (nickel-based alloy powder), aluminum powder, and stainless powder. The conductor powder is not limited to the metal powder. The conductor powder may be ceramics powder or powder containing a carbon fiber and a resin such as carbon fiber reinforced plastics (CFRP). The conductor powder may be other conductive powder.

The manufacturing device 1 is provided with a vacuum chamber 4, a work table (powder holding unit) 5, a lifting and lowering device 6, a powder supply device 7, an electron beam irradiation device (beam irradiation unit, heat source irradiation device) 8, and a controller 31. The vacuum chamber 4 is a container and the inner portion of the container is in a vacuum (low-pressure) state. A vacuum pump (not illustrated) is connected to the vacuum chamber 4. The work table 5 forms, for example, a plate shape. The work table 5 is a holding unit where the metal powder 2, which is a raw material of the three-dimensional component 3, is disposed. The metal powder 2 on the work table 5 is disposed in, for example, layers a plurality of times. The work table 5 forms, for example, a rectangular shape in plan view. The shape of the work table 5 is not limited to the rectangular shape. Alternatively, the work table 5 may have a circular shape or another shape. The work table 5 is disposed in a build tank 10 in, for example, the bottom portion in the vacuum chamber 4. The build tank 10 is a downward recess. In the build tank 10, the work table 5 is movable in a Z direction (vertical direction) and sequentially descends in accordance with the number of layers of the metal powder 2. A side wall 10a of the build tank 10 guides the movement of the work table 5. The side wall 10a forms a square tube shape (cylindrical shape in a case where the work table is circular) so as to correspond to the outer shape of the work table 5. The side wall 10a of the build tank 10 and the work table 5 form an accommodating portion accommodating the metal powder 2 and the three-dimensional component 3 that has been shaped. The work table 5 is movable in the Z direction inside the build tank 10.

The lifting and lowering device 6 lifts and lowers the work table 5, the metal powder 2 in the build tank 10 that is not melted, and the three-dimensional component 3 that is in the making. The lifting and lowering device 6 includes, for example, a rack-and-pinion-type drive mechanism and moves the work table 5 in the Z direction. The lifting and lowering device 6 includes a rod-shaped vertical member (rack) 6a connected to the bottom surface of the work table 5 and extending downward and a drive source 6b for driving the vertical member 6a. An electric motor or the like can be used as the drive source 6b. The electric motor has an output shaft provided with a pinion and the vertical member 6a has a side surface provided with a tooth profile meshing with the pinion. The electric motor is driven, the pinion rotates, power is transmitted, and then the vertical member 6a moves in the vertical direction. By the rotation of the electric motor being stopped, the vertical member 6a is positioned, and then the position of the work table 5 in the Z direction is determined and the position is maintained. It should be noted that the lifting and lowering device 6 is not limited to the rack-and-pinion-type drive mechanism and another drive mechanism such as a ball screw and a cylinder may be provided.

The powder supply device 7 is provided with a raw material tank 11, which is a storage portion where the metal powder 2 is stored, and a powder application mechanism 12 leveling the metal powder 2. The raw material tank 11 and the powder application mechanism 12 are disposed in the vacuum chamber 4. The raw material tank 11 is disposed above the work table 5 in the Z direction. The raw material tank 11 is disposed on both sides of the work table 5 in, for example, a Y direction, which intersects with the Z direction. An overhang plate 13 is provided below the work table 5 and the overhang plate 13 laterally extends from the upper end portion of the side wall 10a of the build tank 10. The overhang plate 13 forms a plane intersecting with the Z direction around the work table 5. The metal powder 2 stored in the raw material tank 11 flows out of the raw material tank 11 and is deposited onto the overhang plate 13.

The powder application mechanism 12 is movable in the Y direction above the work table 5 and the overhang plate 13. The powder application mechanism 12 rakes the metal powder 2 deposited on the overhang plate 13 onto the work table 5 and levels a surface (upper surface) 2a of the uppermost layer of the stack of the metal powder 2 on the work table 5. The lower end portion of the powder application mechanism 12 abuts against the surface 2a of the stack of the metal powder 2 for a uniform height. The powder application mechanism 12 forms, for example, a plate shape and has a predetermined width in an X direction. The X direction intersects with the Z direction and the Y direction. The length of the powder application mechanism 12 in the X direction corresponds to, for example, the total length of the work table 5 in the X direction. The manufacturing device 1 may be configured to be provided with a roller unit, a rod-shaped member, a brush unit, or the like instead of the powder application mechanism 12.

Figure 2:
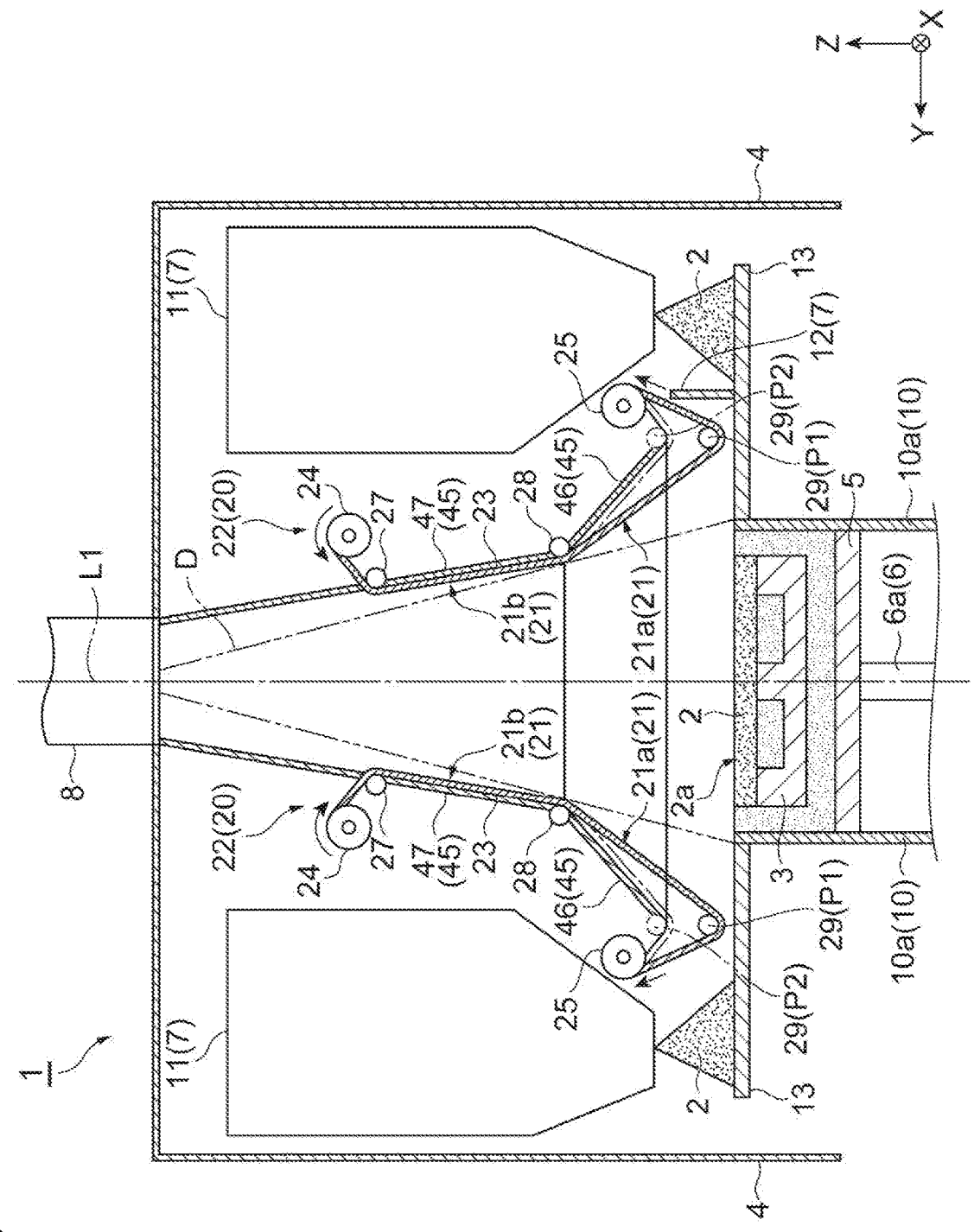
FIG. 2 is an enlarged cross-sectional view illustrating the inside of a vacuum chamber of the additive manufacturing device.

The electron beam irradiation device 8 includes an electron gun (not illustrated) emitting an electron beam as an energy beam. In FIG. 2, a region D through which the emitted electron beam passes is indicated by a two-dot chain line. The electron beam emitted from the electron gun is emitted into the vacuum chamber 4. The metal powder 2 is heated as a result. The electron beam irradiation device 8 functions as a heating unit for melting during the melting of the metal powder 2 and functions as a heating unit for preheating that preheats the metal powder 2 before the melting of the metal powder 2. The electron beam irradiation device 8 may function as a heating unit for sintering during the sintering of the metal powder 2 and function as a heating unit for preheating that preheats the metal powder 2 before the sintering of the metal powder 2. The electron beam irradiation device 8 includes a coil unit controlling the electron beam emission. The coil unit is provided with, for example, an aberration coil, a focus coil, and a deflection coil. The aberration coil is installed around the electron beam emitted from the electron gun and converges the electron beam. The focus coil is installed around the electron beam emitted from the electron gun and corrects a deviation of the focus position of the electron beam. The deflection coil is installed around the electron beam emitted from the electron gun and adjusts the irradiation position of the electron beam. The deflection coil performs electromagnetic beam deflection, and thus the scanning speed during the irradiation with the electron beam can be higher than the scanning speed during mechanical beam deflection. The electron gun and the coil unit are disposed in the upper portion of the vacuum chamber 4. The electron beam emitted from the electron gun is converged by the coil unit, the focal position of the electron beam is corrected, the scanning speed is controlled, and the electron beam reaches the irradiation position of the metal powder 2.

Here, the manufacturing device 1 is provided with a radiant heat recovery unit 20, which recovers the radiant heat that is radiated from the heated metal powder 2. The radiant heat recovery unit 20 is provided with a reflection unit 21 and a reflective surface update unit 22. The reflection unit 21 and the reflective surface update unit 22 are disposed in the vacuum chamber 4. A reflective film 23 including reflective surfaces 21a and 21b is disposed in the reflection unit 21. The reflective surfaces 21a and 21b reflect the radiant heat radiated from the metal powder 2 to the metal powder 2 (work table 5 side). The reflection unit 21 is disposed around the work table 5 in plan view. The reflection unit 21 is disposed in four directions about the work table 5. The reflection unit 21 is disposed so as to face, for example, the X direction and the Y direction. The reflection unit 21 is disposed at a position avoiding the region through which the electron beam (energy beam) passes.

In a case where the reflective surfaces 21a and 21b are viewed from the X direction, the reflective surfaces 21a and 21b facing the Y direction are inclined with respect to an axis L1 extending in the Z direction. The axis L1 is, for example, a virtual straight line passing through the center of the work table 5. The upper end of the reflective surface 21a is disposed at a position closer to the axis L1 than the lower end of the reflective surface 21a. The upper end of the reflective surface 21b is disposed at a position closer to the axis L1 than the lower end of the reflective surface 21b. In the reflection unit 21, the reflective surfaces 21a and 21b are adjacent to each other in the Z direction. The reflective surface (first reflective surface) 21a is disposed below the reflective surface (second reflective surface) 21b. The reflective surface 21a is disposed at a position closer to the work table 5 than the reflective surface 21b. The reflective surfaces 21a and 21b are inclined at different angles with respect to the axis L1. In other words, the reflective surfaces 21a and 21b are inclined at different angles with respect to the surface 2a of the metal powder 2. The surface 2a is, for example, a surface along the X direction and the Y direction and a surface orthogonal to the Z direction. The inclination angle of the reflective surface 21a with respect to the surface 2a is smaller than the inclination angle of the reflective surface 21b with respect to the surface 2a. The reflective surfaces 21a and 21b are formed so as to form, for example, a rectangular shape in a case where the reflective surfaces 21a and 21b are viewed from a direction orthogonal to the reflective surfaces 21a and 21b. The reflective surface 21a may be the only reflective surface and the reflective surface 21b may be the only reflective surface.

The reflective surface update unit 22 disposes new reflective surfaces 21a and 21b in the reflection unit 21 by moving the reflective film 23. The reflective surface update unit 22 is provided with a reflective film supply roll 24, a reflective film recovery roll 25, and a drive unit 26. The reflective film 23 that is yet to be disposed in the reflection unit 21 is wound around the reflective film supply roll 24. The reflective film supply roll 24 unwinds the reflective film 23 by rotating around a rotation axis. The reflective film recovery roll 25 winds the reflective film 23 after the reflective film 23 is disposed in the reflection unit 21. The reflective film recovery roll 25 rotates around a rotation axis by a rotational drive force being transmitted from the drive unit 26. The drive unit 26 is, for example, an electric motor and operates in accordance with a command signal output from the controller 31.

The reflective surface update unit 22 is provided with a plurality of guide rollers 27, 28, and 29 guiding the movement of the reflective film 23. The guide rollers 27, 28, and 29 apply tension to the reflective film 23. The reflective film 23 abuts against the outer peripheral surfaces of the guide rollers 27, 28, and 29. The guide rollers 27, 28, and 29 rotate with the movement of the reflective film 23. The guide rollers 27 to 29 are disposed in order from the reflective film supply roll 24 side.

The guide roller 27 is disposed at a position closer to the work table 5 than the reflective film supply roll 24 in the Z direction. The guide roller 27 is disposed at a position closer to the axis L1 than the reflective film supply roll 24 in the Y direction. The guide roller 28 is disposed at a position closer to the work table 5 than the guide roller 27 in the Z direction. The guide roller 28 is disposed at a position farther from the axis L1 than the guide roller 27 in the Y direction.

The guide roller 29 is disposed at a position closer to the work table 5 than the guide roller 28 in the Z direction. The guide roller 29 is disposed at a position farther from the axis L1 than the guide roller 28 in the Y direction. The guide roller 29 is disposed at a position closer to the work table 5 than the reflective film recovery roll 25 in the Z direction. The guide roller 29 is disposed at a position closer to the axis L1 than the reflective film recovery roll 25 in the Y direction.

The outer peripheral surfaces of the guide rollers 27 to 29 abut against the back surface of the reflective film 23. The surface of the reflective film 23 is a surface constituting the reflective surfaces 21a and 21b. The reflective film 23 unwound from the reflective film supply roll 24 abuts against the guide rollers 27 to 29 and is appropriately bent. The reflective film 23 is wound by the reflective film recovery roll 25. The part of the reflective film 23 that is disposed between the guide roller 27 and the guide roller 28 in the path through which the reflective film 23 passes constitutes the reflective surface 21b. The part of the reflective film 23 that is disposed between the guide roller 28 and the guide roller 29 in the path through which the reflective film 23 passes constitutes the reflective surface 21a.

The reflective surface update unit 22 is provided with a guide roller moving mechanism 41 displacing the guide roller 29. The guide roller moving mechanism 41 is capable of moving the guide roller 29 in the Z direction. The guide roller moving mechanism 41 moves the guide roller 29, such that the guide roller 29 approaches the work table 5, when the metal powder 2 is preheated. The guide roller moving mechanism 41 moves the guide roller 29, such that the guide roller 29 is separated from the work table 5, when the powder application mechanism 12 supplies the metal powder 2 to the work table 5. In other words, when the metal powder 2 is supplied to the work table 5, the guide roller 29 is retracted upward, and thus the movement of the powder application mechanism 12 is not hindered.

The guide roller moving mechanism 41 moves a pair of bearing units (not illustrated) rotatably supporting the guide roller 29 in the X direction. As a result, the guide roller moving mechanism 41 moves the guide roller 29. The guide roller moving mechanism 41 includes, for example, a guide rail guiding the movement of the pair of bearing units and a drive unit driving the bearing units. The guide roller moving mechanism may be configured to be provided with another guide unit, such as a groove portion guiding a movement of a bearing unit, instead of the guide rail. The drive unit of the guard roller moving mechanism may include an electric motor, a ball screw, or the like.

The manufacturing device 1 is provided with a heat shield plate 45. The heat shield plate 45 shields the radiant heat from the metal powder 2. A plurality of the heat shield plates 45 are disposed so as to form, for example, a tubular body. The heat shield plate 45 is disposed so as to face the X direction and the Y direction. The heat shield plates 45 constitute the tubular body and the cross section of the tubular body that intersects with the axis L1 forms, for example, a rectangular shape. The heat shield plate 45 is disposed outside the region irradiated with the electron beam. The opening area of the tubular body formed by the heat shield plate 45 increases toward the work table 5 in the Z direction. The lower end portion of the tubular body has an opening disposed outside the work table 5 in plan view. Stainless steel or the like can be used as the heat shield plate 45. The heat shield plate 45 is fixed to the vacuum chamber 4. The heat shield plate 45 reduces, for example, the impact of the radiant heat on the raw material tank 11.

The heat shield plate 45 includes a first heat shield plate 46 and a second heat shield plate 47. The first heat shield plate 46 is disposed at a position closer to the work table 5 than the second heat shield plate 47 in the Z direction. In the Z direction, a space where the application unit (brush unit) of the powder application mechanism 12 is movable is formed between the lower end of the first heat shield plate 46 and the overhang plate 13. The first heat shield plate 46 and the second heat shield plate 47 are inclined at different angles with respect to the axis L1. The inclination angle of the first heat shield plate 46 with respect to the XY plane is smaller than the inclination angle of the second heat shield plate 47 with respect to the XY plane. In the illustrated example, the heat shield plate 45 is disposed along the reflective film 23 on the back side of the reflective film 23. The reflective film 23 is capable of moving along the surface of the heat shield plate 45.

The reflective film supply roll 24 is disposed on the back side of the first heat shield plate 46 with respect to the axis L1 in the Y direction. The second heat shield plate 47 is provided with an opening portion through which the reflective film 23 passes. A part of the outer peripheral surface of the guide roller 27 may be disposed so as to be exposed to the axis L1 side as compared with the first heat shield plate 46. A part of the outer peripheral surface of the guide roller 28 is disposed in, for example, the gap between the second heat shield plate 47 and the first heat shield plate 46. A part of the outer peripheral surface of the guide roller 28 is exposed to the axis L1 side. The reflective film recovery roll 25 and the drive unit 26 are disposed on the back side of the first heat shield plate 46 with respect to the axis L1 in the Y direction.

The reflective surface update unit 22 includes a dirt sensor 42 detecting dirt on the reflective surfaces 21a and 21b (see FIG. 3). A transparent portion capable of transmitting light or the like is formed in the reflective film 23. The dirt sensor 42 is provided with, for example, a light receiving element. The light receiving element is disposed at a position corresponding to the transparent portion on the back surface side of the reflective film 23. The dirt sensor 42 detects the light transmitted through the transparent portion of the reflective film 23. As a result, the dirt sensor detects the dirt. The light transmitted through the transparent portion is attenuated in a case where, for example, the evaporation component of the metal powder 2 adheres to the reflective film 23 and a decline in reflectance occurs.

The controller 31 illustrated in FIG. 3 is a control unit controlling the entire device of the manufacturing device 1. The controller 31 is a computer including hardware such as a central processing unit (CPU), a read only memory (ROM), and a random access memory (RAM) and software such as a program stored in the ROM. The controller 31 includes an input signal circuit, an output signal circuit, a power supply circuit, and the like. The controller 31 includes a calculation unit 32, a dirt determination unit 33, a reflective surface update control unit (reflective surface update timing setting unit) 34, a guide roller displacement control unit 35, and a storage unit 36. The controller 31 is electrically connected to the electron beam irradiation device 8, the dirt sensor 42, the drive unit 26, the guide roller moving mechanism 41, and the lifting and lowering device 6.

The calculation unit 32 performs electron beam irradiation timing control and control of the irradiation position or the like (irradiation control) by transmitting a command signal to the electron beam irradiation device 8. The calculation unit 32 performs irradiation control on the electron beam during the preheating. The calculation unit 32 performs irradiation control on the electron beam during the melting or sintering of the metal powder 2. The calculation unit 32 performs control on, for example, the operation timing of the powder application mechanism. The calculation unit 32 controls the lifting and lowering device 6. As a result, the calculation unit 32 performs operation control on the work table 5.

The dirt determination unit 33 determines the degree of the dirt on the reflective surfaces 21a and 21b based on information detected by the dirt sensor 42. The degree of reduction in the reflectance of the radiant heat can be determined based on the degree of the dirt. The degree of the dirt on the reflective surfaces 21a and 21b can be determined by means of a determination threshold. The determination threshold can be set based on, for example, a past actual value and experiment data. The determination threshold is stored in, for example, the storage unit 36.

The reflective surface update control unit 34 is capable of determining the update timings of the reflective surfaces 21a and 21b based on the degree of the dirt on the reflective surfaces 21a and 21b. The dirt determination unit 33 functions as an update setting unit setting a movement timing for the reflective film 23 based on the result of the detection by the dirt sensor 42. The reflective surface update control unit 34 transmits a command signal to the drive unit 26. The reflective surface update control unit 34 controls the rotation timing and the rotation amount of the reflective film recovery roll 25. As a result, the reflective surface update control unit 34 controls the movement of the reflective film 23. The movement amount of the reflective film 23 at a time when the reflective surfaces 21a and 21b are updated may be set such that the reflective surfaces 21a and 21b are updated in whole. The movement amount of the reflective film 23 at a time when the reflective surfaces 21a and 21b are updated may be set such that the reflective surfaces 21a and 21b are partially updated. For example, the movement amount may correspond to the length of the reflective surface 21a. The movement amount of the reflective film 23 can be set based on, for example, the rotation angle of the output shaft of the electric motor, which is a drive unit.

The reflective surface update control unit 34 may, for example, regularly move the reflective film 23 at regular intervals. The reflective surface update control unit 34 may regularly move the reflective film 23 before, for example, the initiation of the preheating. The reflective surface update control unit 34 may continuously move the reflective film 23 during, for example, the preheating.

The guide roller displacement control unit 35 controls the guide roller moving mechanism 41. The guide roller displacement control unit 35 moves the guide roller 29 in the Z direction. The guide roller displacement control unit 35 disposes the guide roller 29 below (at a first position P1) during the preheating. The guide roller displacement control unit 35 disposes the guide roller 29 above (at a second position P2) when the metal powder 2 is supplied to the work table 5. The guide roller displacement control unit 35 moves the guide roller 29 upward before the supply operation by the powder application mechanism 12. The guide roller 29 is disposed at the second position P2. The guide roller displacement control unit 35 lowers the guide roller 29 after the supply operation by the powder application mechanism 12 and before the preheating initiation. The guide roller 29 is disposed at the first position P1. As a result, the inclination angle of the reflective surface 21a can be changed.

Next, a three-dimensional component manufacturing method (additive manufacturing method) will be described. FIG. 4 is a flowchart illustrating the procedure of the three-dimensional component manufacturing method. The method for manufacturing the three-dimensional component 3 is executed by means of, for example, the manufacturing device 1.

First, the metal powder 2 is discharged from the raw material tank 11. The discharged metal powder 2 is deposited onto the overhang plate 13. The controller 31 drives the powder application mechanism 12. The powder application mechanism 12 supplies the metal powder 2 onto the work table 5 and levels the surface 2a of the deposit of the metal powder 2 (Step S1). At this time, the guide roller 29 is disposed at the upper second position P2. Accordingly, a region where the powder application mechanism 12 moves is ensured.

Next, the guide roller displacement control unit 35 lowers the guide roller 29 by controlling the guide roller moving mechanism 41 (Step S2). As a result, the guide roller 29 is disposed at the first position P1. Next, the controller 31 controls the electron beam irradiation device 8. The electron beam irradiation device 8 preheats the metal powder 2 on the work table 5 by emitting the electron beam (Step S3; preheating step). The preheating temperature depends on the material of the metal powder 2. The preheating temperature is, for example, 700° C. or more and 1,300° C. or less.

During this preheating, the radiant heat radiated from the metal powder 2 that has reached a high temperature is reflected by the reflective surfaces 21a and 21b, and thus the metal powder 2 is heated (reflection step). Part of the radiant heat is reflected by the reflective surface 21a and the metal powder 2 is heated as a result. Part of the radiant heat is reflected by the reflective surface 21b and the metal powder 2 is heated as a result. Part of the radiant heat is reflected by the reflective surface 21b and then reflected by the facing reflective surface 21b. As a result, the metal powder 2 is heated and the radiant heat radiated from the metal powder 2 can be recovered.

Next, the dirt determination unit 33 determines the degree of the dirt on the reflective surfaces 21a and 21b based on data detected by the dirt sensor 42 (Step S4). The dirt determination unit 33 determines that the reflective surfaces 21a and 21b are dirty in a case where, for example, the amount of the light transmitted through the reflective film 23 is equal to or less than the determination threshold (Step S4; YES). In a case where the amount of the light transmitted through the reflective film 23 exceeds the determination threshold, the dirt determination unit 33 determines that the reflective surfaces 21a and 21b are not dirty (Step S4; NO).

In a case where the reflective surfaces 21a and 21b are dirty, the process proceeds to Step S5 and a winding step is performed for the reflective film 23 (reflective surface update step). Here, the reflective surface update control unit 34 controls the drive unit 26. The drive unit 26 moves the reflective film 23 by rotating the reflective film recovery roll 25. As a result, the dirty part of the reflective film 23 is wound by the reflective film recovery roll 25. A new part of the reflective film 23 is unwound from the reflective film supply roll 24 and supplied to the reflection unit 21. The new part of the reflective film 23 functions as the new reflective surfaces 21a and 21b.

Next, the calculation unit 32 determines whether or not the preheating has been completed (Step S6). The calculation unit 32 determines, for example, whether or not a set preheating time has elapsed. The process returns to Step S4 in a case where the preheating time is yet to elapse (Step S6; NO). In this case, Steps S4 to S6 are repeated until the preheating time continues and the preheating continues. The process proceeds to Step S7 in a case where the preheating time has elapsed (Step S6; YES).

Performed in Step S7 is a melting step of melting the metal powder 2 by irradiating the metal powder 2 on the work table 5 with the electron beam. The controller 31 controls the electron beam irradiation device 8 to emit the electron beam. The melting temperature varies with the material of the metal powder 2. The melting temperature may be, for example, approximately 2,000° C. The controller 31 controls the electron beam irradiation device 8. The controller 31 controls the irradiation position of the electron beam and controls the scanning speed of the electron beam. The part melted as a result of the irradiation with the electron beam is subsequently solidified to form a part of the three-dimensional component 3. In Step S7, a sintering step of sintering the metal powder 2 by irradiating the metal powder 2 on the work table 5 with the electron beam may be performed.

Subsequently, in Step S8, it is determined whether or not the shaping of the three-dimensional component 3 has been completed for every layer. The calculation unit 32 determines whether or not the shaping has been completed with regard to, for example, layers as designed. The manufacturing of the three-dimensional component 3 is completed in a case where the three-dimensional component 3 is completed with the shaping of every layer completed (Step S8; YES). The process proceeds to Step S9 in a case where the shaping of the three-dimensional component 3 is yet to be completed (Step S8; NO).

In Step S9, the guide roller displacement control unit 35 controls the guide roller moving mechanism 41 to lift the guide roller 29. As a result, the guide roller 29 is retracted to the second position P2. The controller 31 controls the lifting and lowering device 6 to lower the work table 5. Ensured is a region where new metal powder 2 is to be stacked. Step S1 is executed after Step S9 is completed. Performed in Step S1 is a step of newly supplying the metal powder 2 onto the work table 5 and leveling the metal powder 2. Steps S2 to S8 are repeated hereinafter in the three-dimensional component manufacturing method. In the three-dimensional component manufacturing method, shaping is performed on every layer of the three-dimensional component 3 and the manufacturing of the three-dimensional component 3 is completed.

In the manufacturing device 1 of the present disclosure, the metal powder 2 held on the work table 5 is preheated, and thus the residual stress that is generated in the three-dimensional component 3 can be suppressed. As a result, in the three-dimensional component 3, the occurrence of deformation and cracking attributable to the residual stress can be reduced. In the manufacturing device 1, the radiant heat radiated from the metal powder 2 is reflected by the reflective surfaces 21a and 21b of the reflective film 23 during the preheating, and thus the heat loss during the preheating can be reduced. In the manufacturing device 1, the new reflective surfaces 21a and 21b can be disposed by the reflective film 23 being moved, and thus it is possible to suppress a decline in reflectance attributable to the reflective surfaces 21a and 21b becoming dirty. As a result, it is possible to reduce a decline in radiant heat recovery efficiency with the manufacturing device 1.

The manufacturing device 1 is provided with the reflective film supply roll 24 and the reflective film recovery roll 25, and thus it is possible to reduce spaces where the reflective film 23 is disposed before use and the reflective film 23 is disposed after use. As a result, the reflective film supply roll 24 and the reflective film recovery roll 25 can be accommodated in the vacuum chamber 4. In the manufacturing device 1, the reflective film supply roll 24, the reflective film recovery roll 25, and the drive unit 26 are accommodated in the vacuum chamber 4, and thus there is no need to open the vacuum chamber 4 and there is no need to restore the vacuum chamber 4 when the reflective surfaces 21a and 21b are updated. Accordingly, the reflective surfaces 21a and 21b can be updated with the vacuum environment in the vacuum chamber 4 maintained. As a result, it is possible to suppress a decline in work efficiency with the manufacturing device 1. With the manufacturing device 1, it is possible to continuously perform continuous operation and suppress a decline in production efficiency.

In the case of a low radiant heat recovery efficiency, the shaping area is limited at the same heat source capacity, and thus the dimensions that allow shaping are restricted. The amount of heat input from a heat source that is used and the energy dissipation of the product (radiant energy and energy resulting from heat conduction) have to be balanced, and thus the size that allows shaping is restricted in the case of a low radiant heat recovery efficiency. With the manufacturing device 1, it is possible to reduce a decline in radiant heat recovery efficiency. Accordingly, a larger three-dimensional component than in the related art can be manufactured even at the same heat source capacity.

In the manufacturing device 1, the reflective film 23 is moved downward from above so as to become close to the work table 5 side, and thus it is possible to move a relatively clean part of the reflective film 23 to a part that is likely to become dirty. In the manufacturing device 1, a relatively dirty part of the reflective film 23 can be excluded from the reflection unit 21 first.

The manufacturing device 1 is provided with the plurality of guide rollers 27, 28, and 29, and thus it is possible to set a movement path for the reflective film 23 by appropriately stretching the reflective film 23. As a result, in the manufacturing device 1, the inclination angles of the reflective surfaces 21a and 21b can be maintained. As a result, the radiant heat can be reliably reflected by the metal powder 2 on the work table 5.

The manufacturing device 1 is provided with the guide roller moving mechanism 41 displacing the guide roller 29. The guide roller moving mechanism 41 is capable of causing the guide roller 29 to approach the work table 5 during the preheating. During the supply of the metal powder 2, the guide roller moving mechanism 41 is capable of moving the guide roller 29 so as to be separated from the work table 5. As a result, the reflective surface 21a can be given an appropriate inclination angle during the preheating and the efficiency of the radiant heat recovery can be improved. The guide roller 29 and the reflective film 23 can be retracted to a position where the operation of the powder application mechanism 12 is not hindered during the supply of the metal powder 2.

The manufacturing device 1 is provided with the dirt sensor 42 detecting the dirt on the reflective surfaces 21a and 21b. The manufacturing device 1 is capable of setting the update timings of the reflective surfaces 21a and 21b in accordance with the degree of the dirt on the reflective surfaces 21a and 21b. It is possible to reliably suppress a decline in reflectance with the manufacturing device 1.

The manufacturing device 1 is provided with the reflective surfaces 21a and 21b. The reflective surface 21a is close to the surface 2a of the metal powder 2, the reflective surface 21b is far from the surface 2a, and the inclination angle of the reflective surface 21a with respect to the surface 2a is smaller than the inclination angle of the reflective surface 21b with respect to the surface 2a. Accordingly, the reflectance by the reflective surface 21a can be improved.

The present disclosure is not limited to the embodiment described above and various modifications as described below are possible within the scope of the present disclosure.

Although the preheating is performed by the electron beam being emitted in the above embodiment, another heating unit such as a heater may be used as a heating unit performing the preheating. A lamp heater performing heating by means of, for example, radiant heat (radiation heat) may be used as the heater. The heater is not limited to a configuration in which the powder bed (powder in the build tank 10) is heated from above the powder bed. The heater may be configured to heat the powder bed from the side of the build tank 10 or from below the build tank 10. For example, in the manufacturing device 1, an induction heating-type heater or a resistance heating-type heater may be provided outside the side wall of the build tank 10 or on the work table 5. In the manufacturing device 1, powder may be preheated by means of the heater.

Although the powder is melted or sintered by the electron beam being emitted in the above embodiment, the beam with which the powder is irradiated is not limited to the electron beam and may be another energy beam (such as a laser). The additive manufacturing device may be provided with, for example, a laser transmitter (heat source irradiation device) and the powder may be melted or sintered by a laser beam being emitted. The manufacturing device that emits the laser beam may be provided with a chamber for maintaining an inert gas atmosphere instead of the vacuum chamber 4. The heat source irradiation device emitting the laser beam functions as a heating unit for melting at a time of powder melting. The heat source irradiation device in this case may be configured to include, for example, an optical component such as a condenser lens or a mirror polarizing the laser beam and a drive unit for moving the mirror. This heat source irradiation device may function as a heating unit for sintering at a time of powder sintering.

The powder may be non-conductive powder. For example, the powder may be non-conductive powder in a case where the manufacturing device 1 is configured to apply charge-less energy such as a laser to the powder.

The heating unit may heat an object including at least one of the powder and the additively manufactured article. The reflection unit may reflect the radiant heat radiated from the powder. The reflection unit may reflect the radiant heat radiated from the additively manufactured article. The reflection unit may reflect the radiant heat radiated from the powder and the additively manufactured article.

Although the reflection unit 21 is disposed in, for example, four places in the above embodiment, the reflection unit 21 may be disposed in one place or two or more places. The direction in which the reflective film 23 moves may be a direction in which the reflective film 23 moves away from the work table 5. The reflective film 23 may, for example, perform an orbital movement around the axis L1. The reflective surfaces 21a and 21b may form, for example, a flat surface or a curved surface.

A case where the reflective film supply roll and the reflective film recovery roll are disposed in the vacuum chamber 4 has been described in the above embodiment. The reflective film supply roll and the reflective film recovery roll may be disposed outside the chamber.

The reflective film 23 may move with continuity or regularity. The entire surfaces of the reflective surfaces 21a and 21b may be updated at once or may be partially updated. The guide roller 29 may not be displaced.

In the above embodiment, the surface 2a of the powder stack (powder layer) is leveled by the powder application mechanism being moved in the Y direction. Alternatively, the surface 2a of the powder layer may be leveled by the powder application mechanism being moved in another direction in the X-Y plane. The manufacturing device may move the powder application mechanism in a circumferential direction. The manufacturing device may level the surface 2a by moving a shaping tank including the work table relative to the powder application mechanism in plan view. The shaping tank may be configured to, for example, reciprocate in the X direction or be movable in another direction. The shaping tank may be configured to be rotatable and movable about a virtual line extending in the Z direction. For example, the manufacturing device may be provided with a holding unit (work table) that is circular in plan view and configured to sequentially perform powder application and beam emission while rotating and moving the holding unit and the powder layer about the virtual line extending in the Z direction (middle portion of the holding unit).

REFERENCE SIGNS LIST

1: manufacturing device (additive manufacturing device)
2: metal powder (powder, object)
3: three-dimensional component (additively manufactured article)
4: vacuum chamber
5: work table (powder holding unit)
8: electron beam irradiation device (heating unit)
21: reflection unit
21a: reflective surface (first reflective surface)
21b: reflective surface (second reflective surface)
22: reflective surface update unit
23: reflective film
24: reflective film supply roll
25: reflective film recovery roll
26: drive unit
29: guide roller
34: reflective surface update control unit (update timing setting unit)
42: dirt sensor.

The invention claimed is:

1. An additive manufacturing device manufacturing an additively manufactured article by melting or sintering layered powder by partially applying energy to the powder, the additive manufacturing device comprising: a powder holding unit configured to hold the layered powder; a heating unit configured to heat the powder held by the powder holding unit by directing an energy beam from the heating unit to the powder holding unit via a region through which the energy beam passes defined therebetween; a reflection unit having a reflective film including a reflective surface disposed outside the region, the reflective surface configured to reflect radiant heat radiated from an object, including at least one of the powder and the additively manufactured article, toward the powder holding unit; and a reflective surface update unit configured to dispose a new reflective surface in the reflection unit by moving the reflective film.

2. The additive manufacturing device according to claim 1,
wherein the reflective surface update unit is provided with:
a reflective film supply roll around which the reflective film yet to be disposed in the reflection unit is wound;
a reflective film recovery roll winding the reflective film after the reflective film is disposed in the reflection unit; and
a drive unit driving the reflective film recovery roll.

3. The additive manufacturing device according to claim 1, comprising a chamber accommodating the powder holding unit,
wherein the reflection unit and the reflective surface update unit are accommodated in the chamber.

4. The additive manufacturing device according to claim 1, wherein the reflective surface is defined on a reflective side by a portion of the reflective film and the reflective surface update unit moves the reflective film to dispose the new reflective surface defined by a different portion of the reflective film on the reflective side while moving the reflective film defining portion from the reflective side.

5. The additive manufacturing device according to claim 1, comprising:
a dirt sensor detecting dirt on the reflective surface; and
an update timing setting unit setting a movement timing for the reflective film based on a result of the detection by the dirt sensor.

6. The additive manufacturing device according to claim 1, wherein
the reflective surface includes a first reflective surface and a second reflective surface disposed at a position farther than the first reflective surface from a surface of the powder held by the powder holding unit, and
an inclination angle of the first reflective surface with respect to the surface of the powder is smaller than an inclination angle of the second reflective surface with respect to the surface of the powder.

7. The additive manufacturing device according to claim 1, comprising a guide roller guiding the movement of the reflective film and rotating with the movement of the reflective film.

8. The additive manufacturing device according to claim 7, comprising a guide roller moving mechanism displacing the guide roller.

9. The additive manufacturing device according to claim 8, wherein the guide roller moving mechanism moves the guide roller so as to approach the powder holding unit side when the preheating by the heating unit is performed and moves the guide roller so as to be separated from the powder holding unit when the powder is supplied to the powder holding unit.

* * * * *